(12) United States Patent
Ashland et al.

(10) Patent No.: US 7,219,234 B1
(45) Date of Patent: May 15, 2007

(54) SYSTEM AND METHOD FOR MANAGING ACCESS RIGHTS AND PRIVILEGES IN A DATA PROCESSING SYSTEM

(75) Inventors: Richard E. Ashland, Fridley, MN (US); Roland G. Clouse, Burnsville, MN (US)

(73) Assignee: Unisys Corporation, Blue Bell, PA (US)

( * ) Notice: Subject to any disclaimer, the term of this patent is extended or adjusted under 35 U.S.C. 154(b) by 1075 days.

(21) Appl. No.: 10/202,111

(22) Filed: Jul. 24, 2002

(51) Int. Cl.
*H04K 1/00* (2006.01)
*H04L 9/00* (2006.01)
*H04L 9/32* (2006.01)
*G06F 7/04* (2006.01)
*G06F 17/30* (2006.01)
*G06F 15/167* (2006.01)
*G06F 15/16* (2006.01)
*G06K 9/00* (2006.01)

(52) U.S. Cl. ................ 713/182; 713/164; 713/165; 713/166; 713/167; 726/2; 726/3; 726/4; 726/5; 726/16; 726/17; 726/18; 726/19; 709/216; 709/217; 709/218; 709/219

(58) Field of Classification Search ............. None
See application file for complete search history.

(56) References Cited

U.S. PATENT DOCUMENTS

| | | | |
|---|---|---|---|
| 4,918,653 A | 4/1990 | Johri et al. ............... 364/340 |
| 4,926,476 A | 5/1990 | Covey ...................... 380/364 |
| 5,204,961 A | 4/1993 | Barlow ..................... 395/395 |
| 5,347,578 A | 9/1994 | Duxbury ................... 380/380 |
| 5,535,383 A | 7/1996 | Gower ..................... 395/395 |
| 5,577,209 A | 11/1996 | Boyle et al. ............... 395/340 |
| 5,748,890 A | 5/1998 | Goldberg et al. ......... 395/395 |
| 5,881,225 A * | 3/1999 | Worth ....................... 726/17 |
| 5,911,143 A | 6/1999 | Deinhart et al. .......... 707/708 |
| 6,014,666 A | 1/2000 | Hedland et al. .......... 707/707 |
| 6,023,765 A | 2/2000 | Kuhn ....................... 713/380 |
| 6,061,684 A * | 5/2000 | Glasser et al. ............. 707/9 |
| 6,119,230 A | 9/2000 | Carter ...................... 713/200 |
| 6,141,778 A | 10/2000 | Kane et al. ............... 714/201 |
| 6,321,259 B1 * | 11/2001 | Ouellette et al. ......... 709/220 |
| 6,978,381 B1 * | 12/2005 | Te et al. ................... 726/18 |

* cited by examiner

*Primary Examiner*—Ayaz Sheikh
(74) *Attorney, Agent, or Firm*—Beth L. McMahon; Charles A. Johnson; Richard J. Gregson (57) ABSTRACT

An improved system and method is provided for managing system-level privileges and for granting access rights to system resources within a data processing system. System-level privileges are assigned directly to individual users. In contrast, access rights are assigned to individual users and/or to groups of users using data constructs known as Access Control Records (ACRs). Each ACR associates one or more user groups and/or one or more individual users with a set of access rights. A system resource is then associated with an ACR. The users identified within the associated ACR are thereby granted access to the object using the access rights specified by the ACR. An ACR may define multiple sets of access rights, with each set of access rights being associated with one or more user groups and/or one or more individual users.

40 Claims, 7 Drawing Sheets

SYSTEM AND METHOD FOR MANAGING ACCESS RIGHTS AND PRIVILEGES IN A DATA PROCESSING SYSTEM

FIELD OF THE INVENTION

The current invention relates generally to security in data processing systems, and more particularly, to a system and method that utilizes group definitions to control access to objects within the data processing system.

BACKGROUND OF THE INVENTION

Most modern data processing systems include some mechanism to control system access, and further to control access to the various resources available within the system. Generally, a user gains access to a system by supplying a user identification ("userid") and password. This information is compared against previously stored authorization information, and if a favorable compare occurs, the user is granted access to the system.

Once the user has gained system access, other types of access control mechanisms are used to limit the types of operations the user may perform. In many systems, the types of operations a user may perform are generally associated with a user's role with respect to the data processing system. For example, a system administrator may be granted the right to back up and restore files, perform security tasks, or engage in tasks that produce system-wide changes. The right to perform these types of operations is controlled by assigning each user a set of "system privileges".

Another type of control mechanism is generally provided to control the types of files, directories, and other resources a user may access. This type of control mechanism involves the assignment of "access rights" that allow a user to perform certain operations on a resource. For example, such access rights may be granted to allow a user to read from, and write to, a file. A user may also be allowed to create or delete a file. Other types of access rights may include executing or launching a program.

Prior art systems generally control the granting of access rights by creating groups of users. Each group associates one or more users with a common set of access rights. A group is then associated with one or more system resources such as files. In this manner, the users in a group are allowed to access the system resources that have been associated with the group. This access is provided according to the common set of access rights specified by group.

The creation of groups simplifies some of the tasks associated with managing access to files, directories, and other resources, since multiple users can be treated as a single unit for purposes of granting access rights. However, inefficiencies exist within this prior art system. For example, a group is generally associated with a resource such as a file by updating the file to include some type of data that identifies the group. A file may store hundreds of such identifiers, each identifying a corresponding group. This increases the size of the file, and creates administrative inefficiencies. Every time a new group of users is created, each file that is to be associated with this new group must be updated to include the group identifier. The same is also true when a group is deleted. Because large data processing systems store thousands, if not millions, of files, maintaining a system that is current may become a daunting management task. This process is further complicated in systems having a large number of users, many having access rights that are often changing.

Another problem associated with the prior art system involves the fact that a group is used to assign both access rights and system privileges to the users that are members of the group. Thus, even though a large number of users share a common set of access rights, these users cannot be members of the same group if they do not also share a common set of privileges. This greatly increases the number of groups that must be created, increasing system overhead, and also consuming storage space.

An improvement to the foregoing system creates groups of users that are assigned a common set of access rights, but are not assigned system privileges. The system privileges are instead assigned directly to the users themselves. In this manner, users may be grouped in a manner that does not take into consideration the privileges. This allows for the creation of fewer groups, making group management more efficient. However, this approach does not address inefficiencies that exist when associating system resources to the groups of users.

What is needed, therefore, is an improved system and method for managing system privileges and access rights within a data processing system.

SUMMARY OF THE INVENTION

The current invention provides an improved system and method for managing system privileges and controlling access to system resources. These resources, which may also be referred to as system "objects", include data files and executable programs. According to the current invention, groups of users are created, with users being identified via userids, or through any other mechanism known in the art. These groups do not associate the users with access rights or system privileges. Access rights are assigned to users using additional data constructs known as Access Control Records (ACRs). Each ACR associates one or more groups of users and/or one or more individual users with one or more access rights. Each object is then associated with a single ACR. In a preferred embodiment, this association is created by storing an identifier for the ACR within the object. The users identified by the ACR, either individually or as a group, are thereby granted access to the object using the access rights specified by the ACR.

According to one embodiment of the invention, each ACR may identify multiple sets of access rights. Each set of access rights may be associated with one or more groups of users and/or one or more individual users. When an object is then associated with an ACR, the users identified within the ACR gain access to the object according to the set of access rights associated by the ACR.

In a manner similar to that discussed above with respect to access rights, groups likewise do not assign system privileges. Instead, system privileges are assigned directly to individual users. In one embodiment, the privileges are associated with a user's userid. This greatly reduces the number of groups that are needed, minimizing storage requirements and system overhead.

Another advantage provided by the current system and method involves the simplification of system management. According to the invention, access rights are granted or denied by updating an existing ACR, rather than by creating an entirely new group, as was done in the past. A modification to an ACR updates the access rights for any objects associated with the ACR. This system and method thus eliminates the need to update hundreds, if not thousands, of objects each time a new group of users is added or deleted, and/or new access rights are assigned or denied. Moreover, the size of the objects can be minimized, since each object need not identify a long list of user groups.

In one embodiment of the invention, a group may include one or more other user groups and/or one or more userids. This allows for a hierarchical group structure that may be organized in a manner that parallels the organization of work groups.

In one mode of the invention, a method is provided for controlling access to objects stored within a data processing system. The method includes the step of creating a group of users of the data processing system. A record is created that identifies the group, and further identifies a set of one or more of the access rights. The record is mapped to one or more objects, whereby the one or more users are allowed to access the one or more objects according to the set of one or more access rights.

According to another embodiment, a system for granting access rights to users of a data processing system is provided. The system includes means for creating groups of the users, and means for creating records, with each record identifying at least one of the groups, and further identifying one or more of the access rights. The system also includes means for storing objects, and means for associating any one or more of the objects each with one of the records. Users included in the at least one of the groups are thereby granted the identified one or more access rights to access the object.

In still another embodiment, a system is provided for controlling access to objects stored within at least one storage device of a data processing system. The system includes first circuits included within the at least one storage device to store one or more groups, wherein each group specifies one or more of the users of the data processing system. The system further includes second circuits included within the at least one storage device to store one or more records, each record associating at least one of the groups to a set of one or more of the access rights. The system also provides third circuits included within the at least one storage device to store, for each of the objects, an identifier that associates an object with a respective one of the records. This allows the groups of users specified by the respective one of the records to gain access to the object according to the access rights associated with the groups of users. According to one aspect, the system further includes fourth circuits included within the at least one storage device to associate ones of the users with system privileges.

Other objects and aspects of the invention will become apparent from the following description and the accompanying drawings.

DETAILED DESCRIPTION OF THE DRAWINGS

Figure 1:
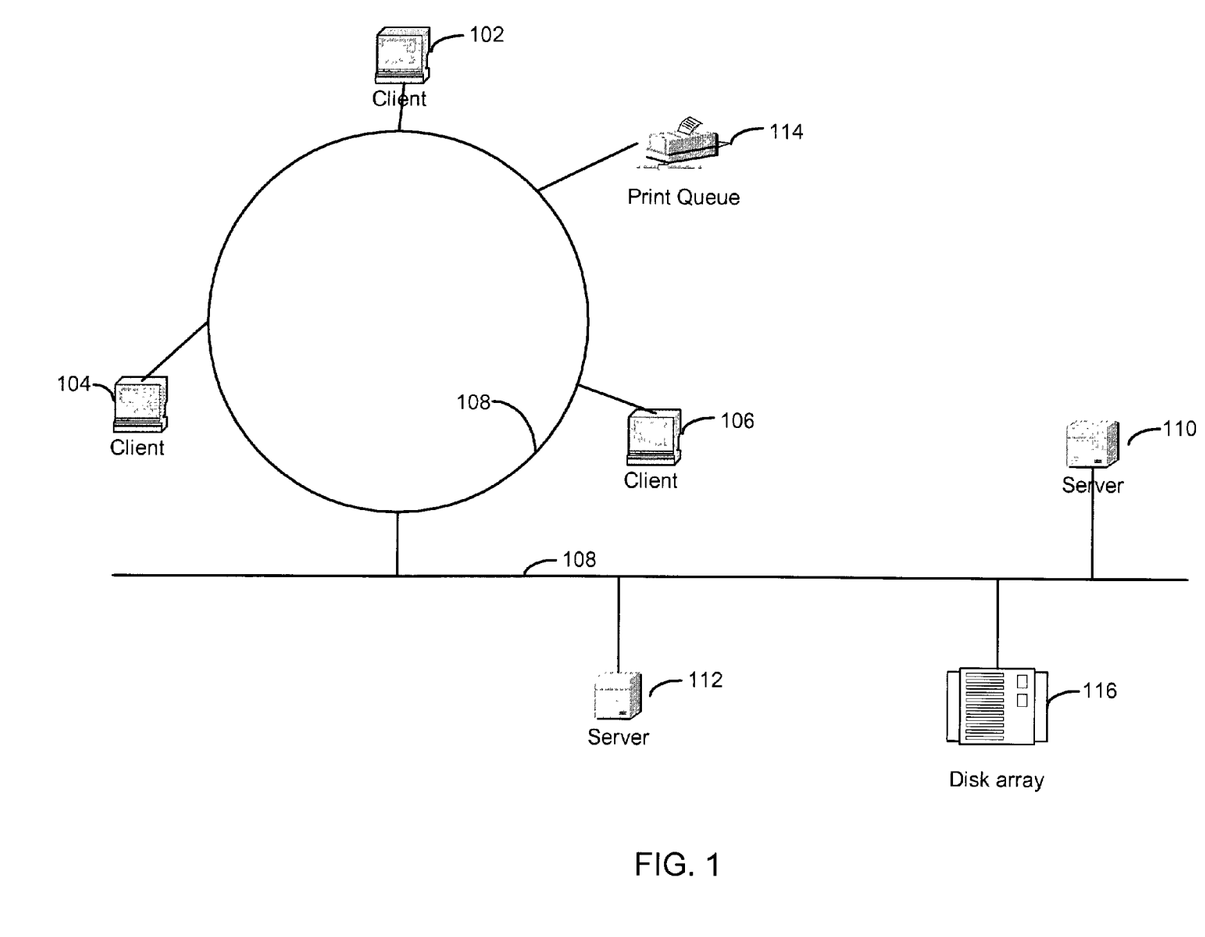
FIG. 1 is a block diagram of an exemplary system as may employ the current invention.

FIG. 1 is a block diagram of an exemplary data processing system of the type that may usefully employ the current invention. The system includes one or more clients 102, 104, and 106 coupled to a network 108. These clients may include, without limitation, workstations, personal computers, personal data assistants, dumb terminals, or any other type of client. Network 108 may comprise one or more LANs, wide-area networks, private internets, secure internets, value-added networks, extranets, intranets, virtual private networks, value-added networks, or any other types of communication networks.

Also residing on network 108 are one or more servers 110 and 112. These servers may be multiprocessor systems such as an ES7000 system commercially available from Unisys Corporation. Alternatively, one or more servers may be uniprocessor, or clustered processor machines. The servers may be configured, without limitation, as internet servers, print servers, general file servers, transaction processing servers, directory service providers, name servers, software component servers, or any combination thereof. In one embodiment, one or more of servers 110 and 112 may also be clients. Similarly, ones of the clients may also function as servers. This may happened, for example, when a system is running Microsoft Windows NT software.

Other devices may also interface to network 108. These devices may include one or more printers such as printer 114 and/or one or more persistent storage devices such as disk array 116. While one exemplary embodiment of a data processing system is shown in FIG. 1, those skilled in the art will appreciate that the current invention is adaptable for use with a variety of other configurations and data processing systems.

Figure 2:
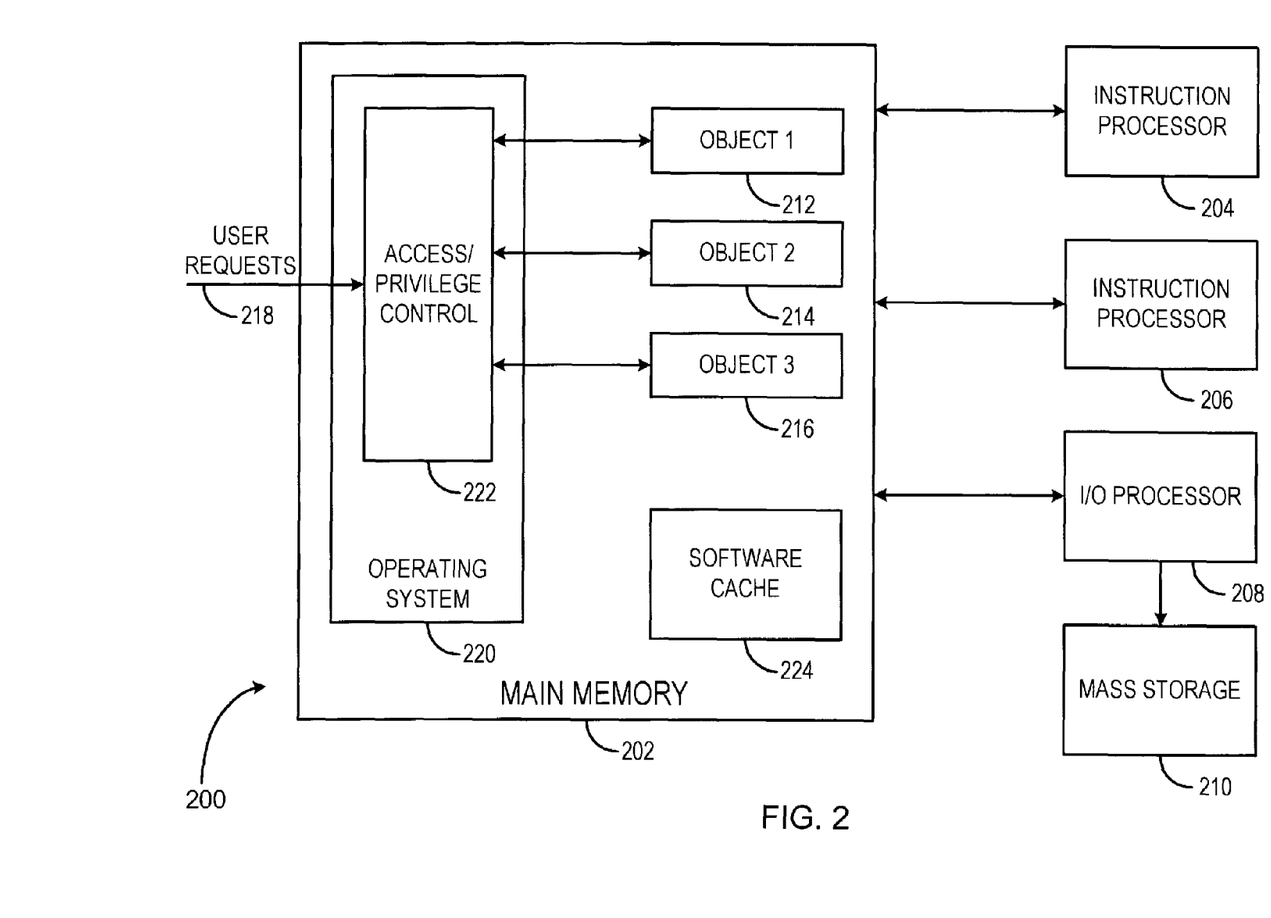
FIG. 2 is a system block diagram of an exemplary server 200 that may usefully employ the current invention.

FIG. 2 is a system block diagram of an exemplary server 200 that may usefully employ the current invention. This server configuration could be embodied in servers 110 and/or 112. It will be understood that many other server configurations may usefully employ the current invention. Server 200 includes a main memory 202 coupled to one or more instruction processors (IPs) 204 and 206. Main memory 202 is further coupled to one or more input/output processors (IOPs) such as IOP 208 for transferring data signals stored on one or more mass storage devices 210 to main memory.

Main memory 202 stores one or more objects 212, 214, and 216. Within the context of the current invention, an object may be a file such as a data file, or an executable software system or subsystem such as a database manager. Such a system is generally callable by multiple users and/or other software applications, is reusable and reentrant, and may include a protected data space. As is known in the art, some software systems have additional hardware defined data and code protection attributes that may include rings, domains, keys, address trees, storage limits, and gates.

User requests are provided from one or more of the clients to server 200, and may be provided via a network 218 that is similar to network 108. Each request may require access to one or more of objects 212, 214, and 216, and/or may involve performing operations that are considered privileged. Users are authenticated by various means before any access requests are considered.

Requests are managed by operating system 220, which performs resource allocation for the system. In particular, operating system includes access/privilege control means 222 for controlling access to system resources including objects 212, 214, and 216, and for controlling execution of privileged operations. For purposes of the following discussion, access control refers to controlling access to an object. This control is accomplished by assigning predetermined access rights to users. Examples of the types of access rights that may be granted include, but are not limited to, the ability to create, read from, write to, execute, launch, and delete a particular object. A user's access to a particular object is limited by the access rights that have been granted to that user for that object.

In contrast to access control, privilege control involves granting the ability to perform restricted operations within the system. These restricted operations are generally associated with a user's role with respect to the data processing system. For example, a system administrator may be granted privileges associated with backing up and restoring files, performing security tasks, or performing tasks that produce system-wide changes. These types of privileges will not be granted to ordinary system users. The types of privileges that exist for a server are often specific to the type of operating system that is being executed by the server.

Also shown in FIG. 2 is a software cache 224. A software cache is an area of main memory dedicated to storing records read from mass storage 210 so that these records are readily available to applications executing on the server. The use of a software cache is discussed further below with respect to the current invention.

Figure 3:
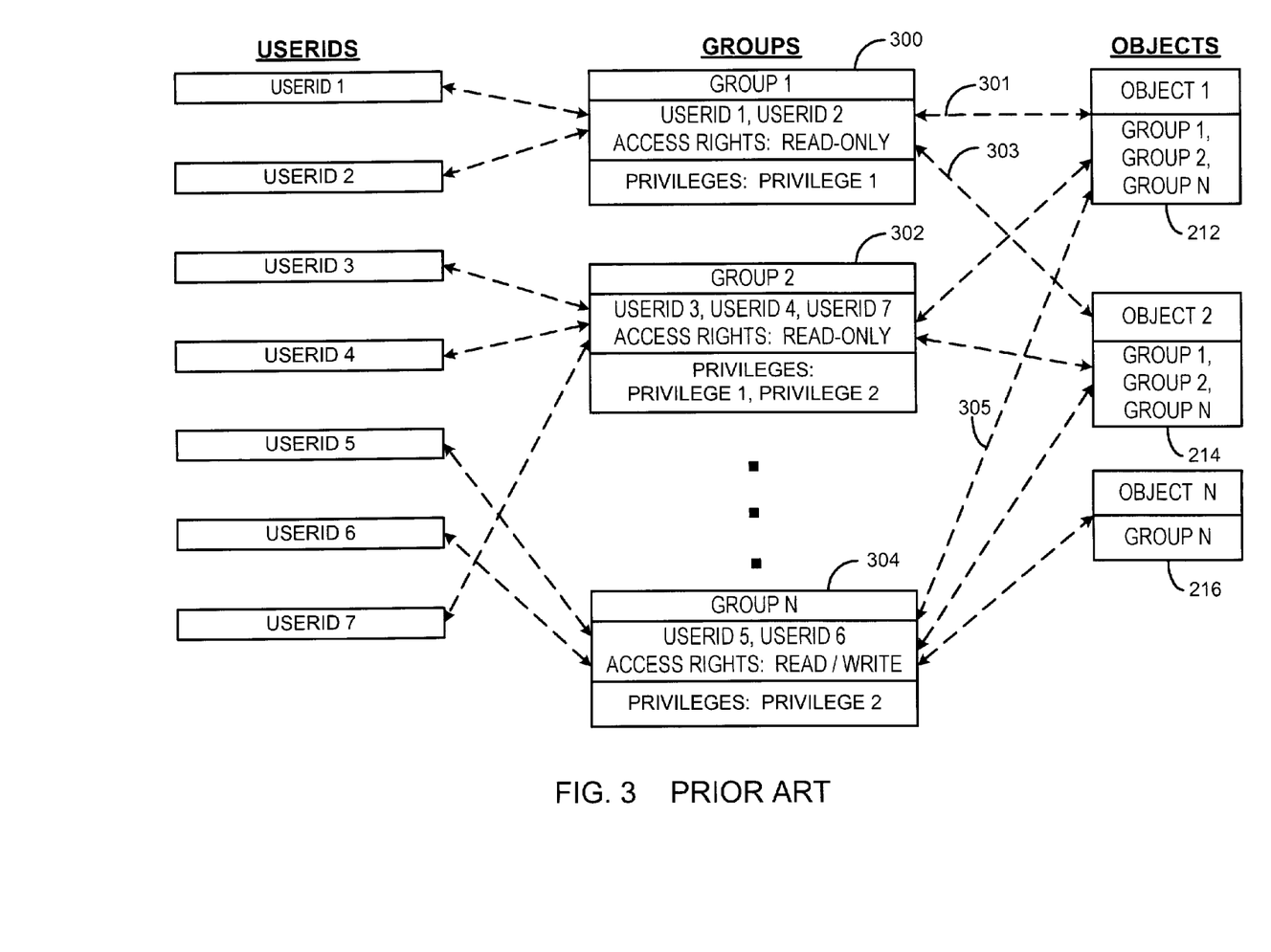
FIG. 3 is a block diagram illustrating a prior art method of performing access and privilege control.

FIG. 3 is a block diagram illustrating a prior art method of performing access and privilege control functions of the type discussed above in regards to access/privilege control means 222. According to this method, a record called a "group" is created to associate a particular user with the access rights that have been granted to the users of the group for referencing a particular object. The group identifies the user via the user's identification, or "userid". The group record further identifies the various privileges that have been assigned to the user. For example, Group 1, 300, grants users having the userids "Userid1" and "Userid2" access rights of "read only". These access rights are granted to the users for purposes of referencing various objects, including object 1, 212 and object 2, 214, as is indicated by dashed lines 301 and 303, respectively. Record 300 further grants these users a privilege of "privilege 1". This privilege need not be associated with object 1 or object 2, and is instead generally associated with a privileged system operation such as performing backup operations, as discussed above.

In a manner similar to that shown in regards to group 300, group 302 grants users having userids "Userid3", "Userid4" and "Userid7" with access rights of "read only" with respect to object 1, 212. These users are also granted privileges of "privilege 1" and "privilege 2". Similarly, group N, 304, grants users having userids "Userid5" and "Userid6" with a privilege of "privilege 2", and access rights of "read/write" with respect to objects 1, 2, and N. Many more userids and groups may be defined for a given system. Additionally, a system may store many more objects, as will be discussed below.

Several aspects of the prior art system may be noted from FIG. 3. First, in prior art systems, an association between an object and a group is created by storing some identification of the group within the object. In FIG. 3, for example, object 1 is shown storing a respective identifier for groups 1, 2, and N. Each stored identifier could be an ASCII, numeric, or any other type of representation that uniquely corresponds to the group. This forms the associations represented by dashed lines 301, 303, and 305, respectively. As discussed above, these associations between an object and one or more groups are created to grant a group of users a particular set of access rights to an object. For example, object 1 is associated with groups 1, 2, and N such that the users having userids included within any of these groups are granted some access rights to object 1. In the current example, the users having userids that are included within groups 1 or 2 are granted read-only access to object 1, whereas the users having userids included within group N are granted read/write access to object 1.

Using the mechanism shown in FIG. 3 can be cumbersome. When new groups are added to the system, each object that is to be associated with that group must be updated. For example, assume that a new group X is defined that is to be associated with objects 1, 2, and N. Each of these objects must be individually updated to store an identifier for group X. In a system storing hundreds, or even thousands, of objects, this is a formidable task. Similar problems are associated with the deletion of one or more groups. In an organization that may have many users, and may further have an organizational structure that changes over time such that access rights for a given user may also change, the creation or deletion of groups may be a common-place occurrence, further exasperating the problem.

Another inefficiency associated with the system of FIG. 3 is caused by the fact that privileges are assigned within groups. As a result, users must be grouped according to the sets of privileges assigned to the users, necessitating the creation of additional groups. For example, in FIG. 3, group 1, 300 assigns a first group of users a privilege of "privilege 1", whereas group 2, 302, assigns a second group of users the privileges "privilege 1" and "privilege 2". If not for the assignment of privileges within groups, these two groups could be combined into one group.

Figure 4:
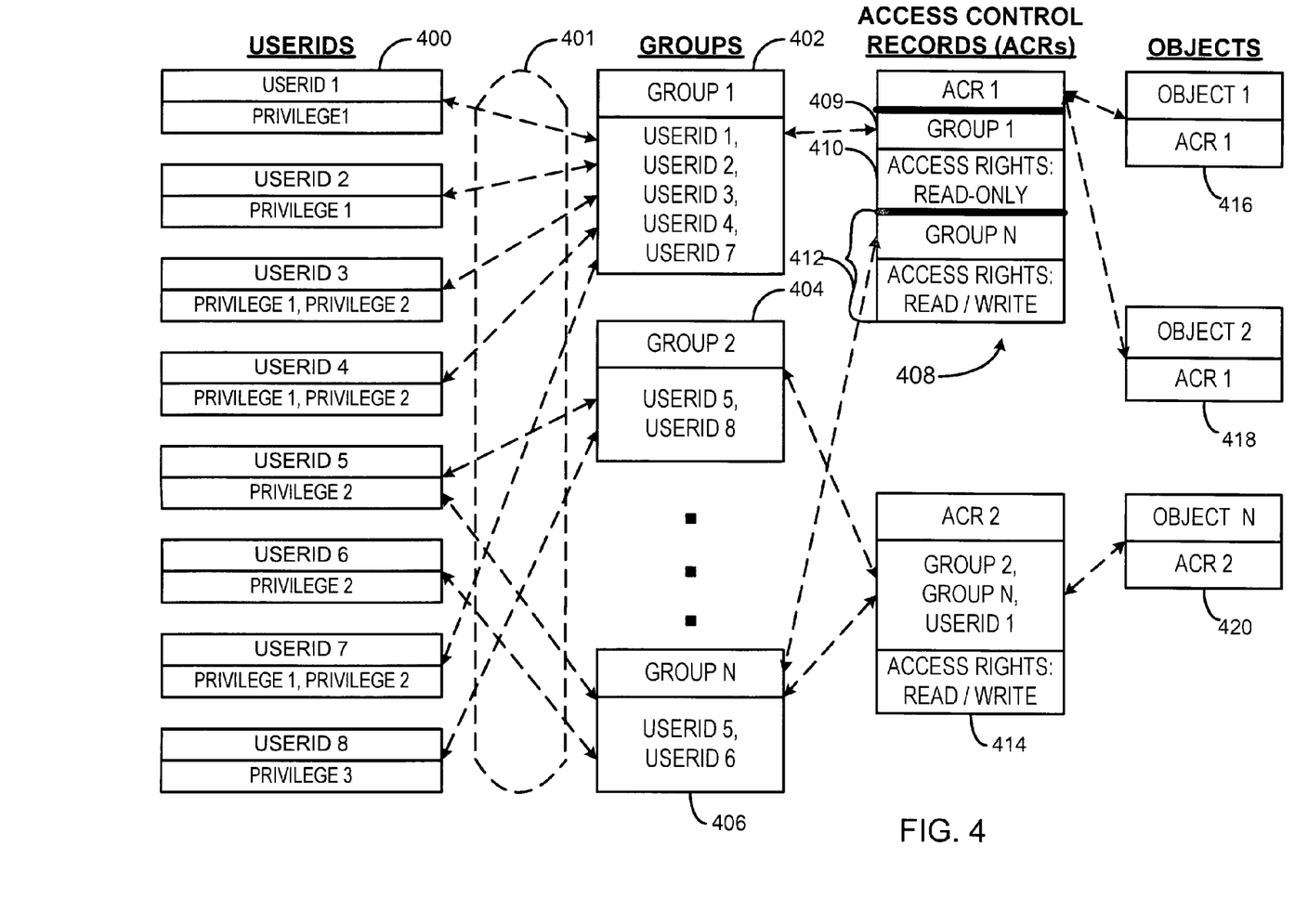
FIG. 4 is a block diagram of a system and method for managing access rights and system privileges according to the current invention.

FIG. 4 is a block diagram of a system and method for managing access rights and system privileges according to the current invention. Before continuing, it will be noted that the following discussion speaks in terms of granting access rights and privileges to userids. It will be understood, however, that the rights and privileges are in actuality being granted to users having those userids. According to the current invention, privileges are associated directly with individual userids rather than being associated with groups of users as was discussed above in reference to FIG. 3. In a preferred embodiment, privileges that are assigned to a userid are stored within a userid record. For example, record 400 created for "Userid 1" stores an identifier for "privilege 1", and so on. In another embodiment, the association between users and privileges may be created by storing a list of userids with a record specifying a privilege. In still another embodiment, the privilege may be associated with a pointer to a list of userid records. Many other possibilities for creating this association will be contemplated by those skilled in the art. Regardless of how this association is created, it is important to note that privileges are assigned directly to users without using groups.

The current invention further employs groups that identify userids in a manner similar to that shown in FIG. 3. For example, group 1, 402, includes an identification for "Userid1", "Userid2", "Userid3", "Userid4" and "Userid7", Group 2, 404, includes an identification for "Userid5" and "Userid8", and so on. Any type of identification may be stored within a group to correlate a userid to the group, including an ASCII or numeric representation of the userid.

It may be noted that unlike the system shown in FIG. 3, the groups of the current invention only make associations between userids. The groups do not correlate these userids with either privileges or access rights. The privileges are associated directly with the userids in the manner discussed above, and the access rights are stored within other constructs called Access Control Records (ACRs).

An ACR associates access rights with one or more groups and/or one or more userids. For example, ACR 1, 408, is shown having a field 409 for storing identifiers for one or more groups and/or one or more userids. Field 409 includes an identifier for "Group 1", but may include additional group identifiers and/or userid identifiers. ACR 1, 408, further includes another field 410 for storing a set of access rights shown as "read-only". Together, fields 409 and 410 may be considered an ACR entry that grants the access rights of "read-only" to all userids included within group 1, 402. ACR 1 includes an additional entry 412 that grants all userids included within group N, 406, access rights of "read/write". An ACR may an unlimited number of such entries.

Also shown in FIG. 4 is ACR 2, 414. ACR 2 grants access rights of "read/write" to userid 1, and also to the userids included within Group 2 and Group N.

Next, associations between objects and ACRs may be created. This can be accomplished by storing an identifier to an ACR within an object. For example, object 1, 416, and object 2, 418, each stores an identifier for ACR 1, 408. Object N, 420 stores an identifier for ACR 2, 414. Any type of identifier may be used in the manner discussed above. The identifier may be an ASCII string, a pointer to the data construct defining the associated ACR, or any other type of indication that uniquely correlates the ACR to the object. In another embodiment, the association may be created by storing one or more object identifiers within an ACR. However, the relatively large number of objects that exists within most systems, as well as the frequency with which objects are created and deleted, make this latter embodiment less desirable.

The association that is created between an object and an ACR is used to grant access rights to the object. For example, because of the association created between object 1, 416, and ACR 1, 408, all userids within group 1, 402, are granted read-only access rights, and all userids within Group N are granted read/write access rights, to object 1.

Several observations may be made by comparing the mechanism of FIG. 3 with that shown in FIG. 4. First, far fewer groups need to be defined within the system of FIG. 4 than within that of FIG. 3. This is due, in part, because the current system allows privileges to be assigned directly to userids rather than being stored within the groups. Thus, userids may be grouped within ACRs based only upon whether these userids are associated with one or more common sets of access rights, and irrespective of whether the userids are associated with different sets of privileges. For example, records 300 and 302 of FIG. 3 may be combined into ACR 408 since, according to the current invention, the different sets of privileges identified by records 300 and 302 can be disregarded.

In addition to the foregoing advantages, the current system provides a simplified mechanism for managing the access rights of users. In data processing systems employing the current system and method, a single ACR may be associated with hundreds, or even thousands, of objects. Access rights for this entire set of objects may therefore be updated by simply updating a single ACR. For example, in FIG. 4, ACR 1, 408, is associated with both objects 1 and 2. A new group of users may be granted access rights to these objects by modifying ACR 1 to include an additional entry that associates this new user group with an appropriate set of access rights. This provides an improvement over prior art systems, wherein both objects 1 and 2 must be updated to reference this additional group.

Another benefit associated with the current system involves the ease with which objects may be created. In prior art systems, the task of creating an object involves specifying one or more groups that will define the access rights for that object. For example, object 1, 212, of FIG. 3 identifies three groups. As noted above, this list of objects may be significantly longer. Identifying these groups makes the task of creating objects tedious and time-consuming. In contrast, objects within the current system each identify a single ACR. This simplifies object creation, and minimizes the amount of storage space required to retain the objects. In many instances, an ACR will already exist that can be used to define the desired access rights for a newly-created object, further simplifying this process.

Yet another advantage associated with the current system involves the elimination of the access rights from the groups. In prior art systems, group definitions associate access rights with the userids. Therefore, in an exemplary situation wherein a group of users requires read-only access to a first set of objects, but read/write access to a second set of objects, multiple group definitions are required. In contrast, the current system requires the use of a single group definition in this instance, since the access rights are associated with the userids by the ACRs, and not the groups.

Finally, the flexibility associated with ACRs makes these constructs particularly easy to use. Each ACR may include one or more entries, with each entry identifying one or more groups, and/or one or more userids in the manner discussed above. Thus, if it is desirable to grant several users access to a single object within a system, it may be more efficient to add the userids to an ACR entry rather than to modify an existing group. Thus, the use of ACRs provides various options for achieving a desired result.

As shown in FIG. 4, groups are defined by associating one or more users with a group name. In one embodiment, this occurs by storing a list of userids within a group construct. In another embodiment, one or more group names are stored with a userid. In a preferred embodiment, both methods are used to create a "double link" between userids and group names. This is illustrated by the bi-directional arrows provided on dashed lines 401. This double link may be useful if a userid is deleted, for example. The link allows the userid to be automatically deleted from all groups that include it without requiring manual intervention or an expensive search of all groups. Similarly, if a group is deleted, the association between the userid and the group may be automatically deleted.

Figure 5:
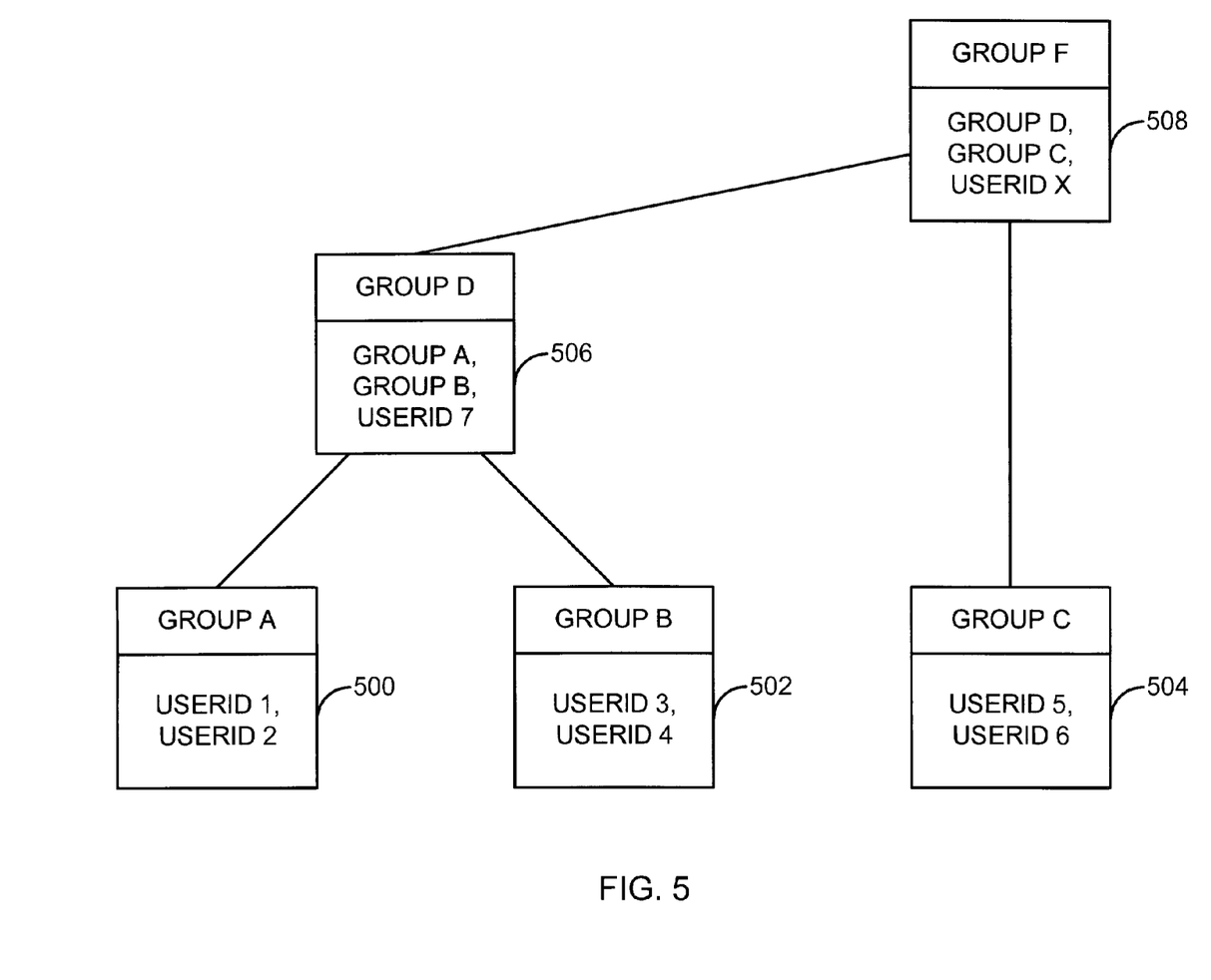
FIG. 5 is a block diagram illustrating one method of defining groups.

FIG. 5 is a block diagram illustrating a method of defining groups in a hierarchy. According to this method, groups may be defined by identifying one or more userids, and/or one or more groups. In the example of FIG. 5, "Group A", 500, "Group B", 502, and "Group C", 504 identify only userids. This may be accomplished using any of the association mechanisms known in the art, as discussed above. These group definitions are then used to define "Group D", 506, and "Group F", 508. For instance, Group D is defined as "Group A", "Group B", and "Userid 7". Group F is defined as "Group C" and "Group D", and "Userid X". Thus, in this example, userid 1 is considered a member of Groups A, D, and F. This shows the manner in which both userids and/or groups may be used to define a new group. More or fewer levels of hierarchy may be included within the group definitions.

According to one embodiment of the invention, the hierarchy used to define groups may parallel the hierarchy of a corporate entity. For example, one or more groups may be defined to represent one or more personnel groups within a corporation. These groups could then be used to define one or more groups that represent a corporate division, and so on. This may be useful since people having common job descriptions and duties often reside within the same personnel group, and generally require similar access rights to similar objects.

As discussed above, ACRs are used to create associations between one or more groups of users and the rights required to access one or more objects. According to one aspect of the invention, the group definitions are themselves considered objects, and access to these group definitions may be controlled through ACRs, as discussed below.

Figure 6:
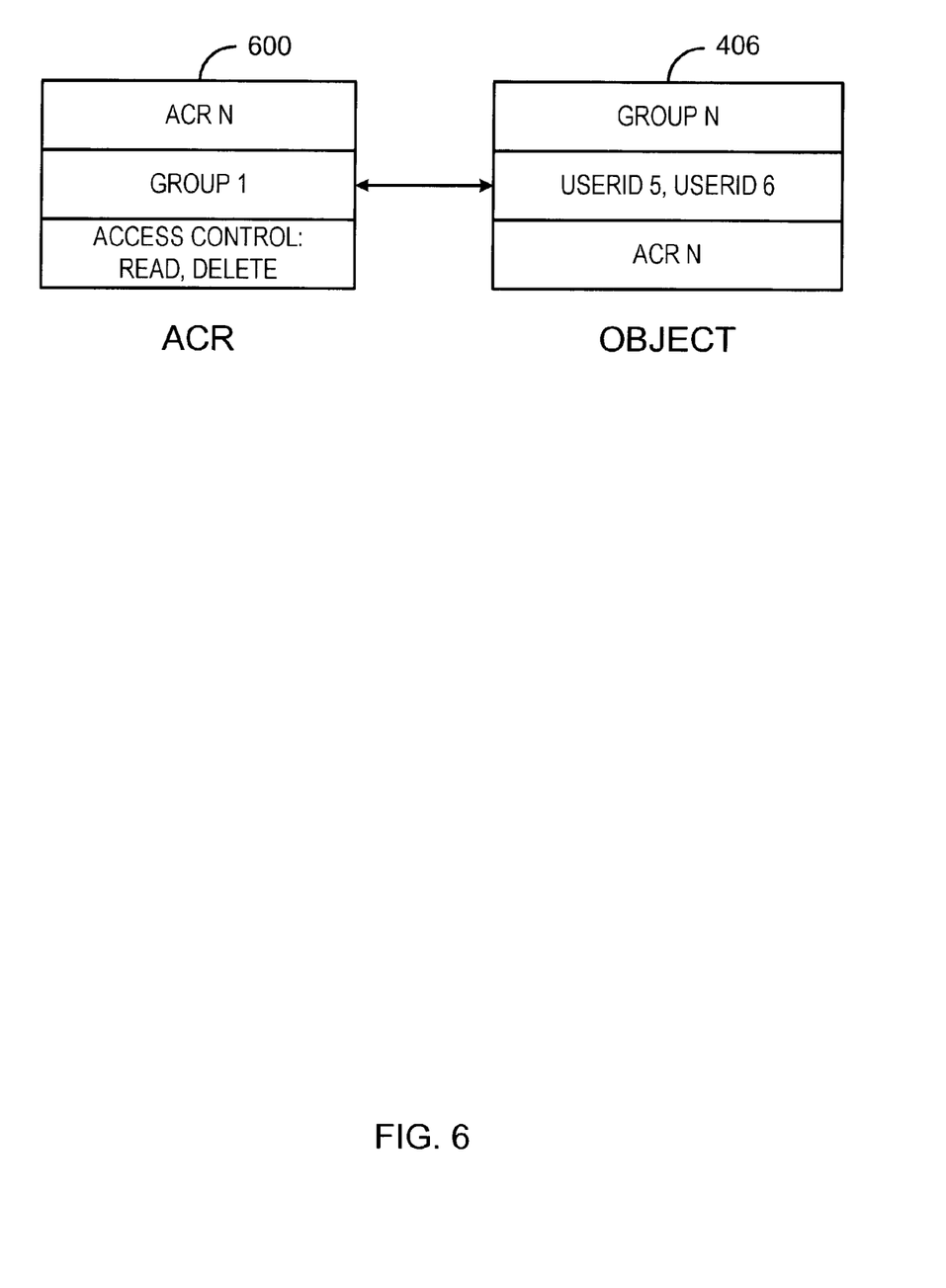
FIG. 6 is a block diagram illustrating the use of an Access Control Record to control access to a group definition.

FIG. 6 is a block diagram illustrating the use of ACR N, 600, to control access to the group definition for group N, 406. This type of access control is provided to prevent certain users from performing such activities as reading, modifying or deleting the information within a group. In the current example, ACR N grants the users of group 1 the ability to read the contents of Group N, 406, and to further delete this group definition. Using this mechanism, the contents of a group definition may be made public, or may be hidden from view.

According to another aspect of the current invention, each user of the system may be granted the ability to create a number of group definitions. That number, which may be unique to each user, may be associated with a user's userid in a manner similar to the way in which privileges are assigned to a userid. In one embodiment, a system default value is used to determine the number of groups a user may create. This default value may be over-ridden by assigning a different value to the userid.

Returning to FIG. 4, it will be appreciated that the various constructs shown in that illustration may be stored within one or more storage devices of a data processing system such as is shown in FIG. 2. For example, some of the objects, ACRs, and group definitions, and userids may be stored within mass storage 210, or within main memory 202.

In another embodiment of the invention, system performance is enhanced by storing group definitions and ACRs within a software cache. As discussed above in reference to FIG. 2, a software cache such as cache 224 resides within main memory 202, and is used to store records from mass storage 210. Such a cache may be used to store group definitions and ACRs so that access to objects may be granted without performing I/O operations to mass storage.

According to one aspect of the invention, group definitions and ACRs may be selectively stored within a software cache based on the type of operations performed by a user, and further based on the type of privileges assigned to that user. For example, within data processing system 200, some applications such as transaction processing programs may be adapted to be particularly high-performance. The site administrator therefore establishes the system environment that is needed to support this type of application execution. Once the environment is established, a user may then request that a high-performance transaction processing "session" be initiated. If the user has been granted the privilege to conduct such a session, the group definitions for the user's userid are loaded from mass stored into software cache 224. Subsequent requests may then be completed much more quickly than would otherwise be the case if I/O operations had to be performed to complete access validation. The privilege to execute this type of high-performance session may be associated directly with a user's userid in the manner discussed above in reference to FIG. 4.

In one embodiment, group definitions may be loaded into software cache 224 as requests for high-performance sessions are initiated. In another embodiment, some or all of the group definitions and ACRs may be loaded into software cache 224 at system boot time. In a preferred embodiment, the ACRs and group definitions are loaded at different times. For example, some or all of the ACRs are loaded into the software cache at boot time, whereas the group definitions are loaded as high-performance sessions are initiated.

Figure 7:
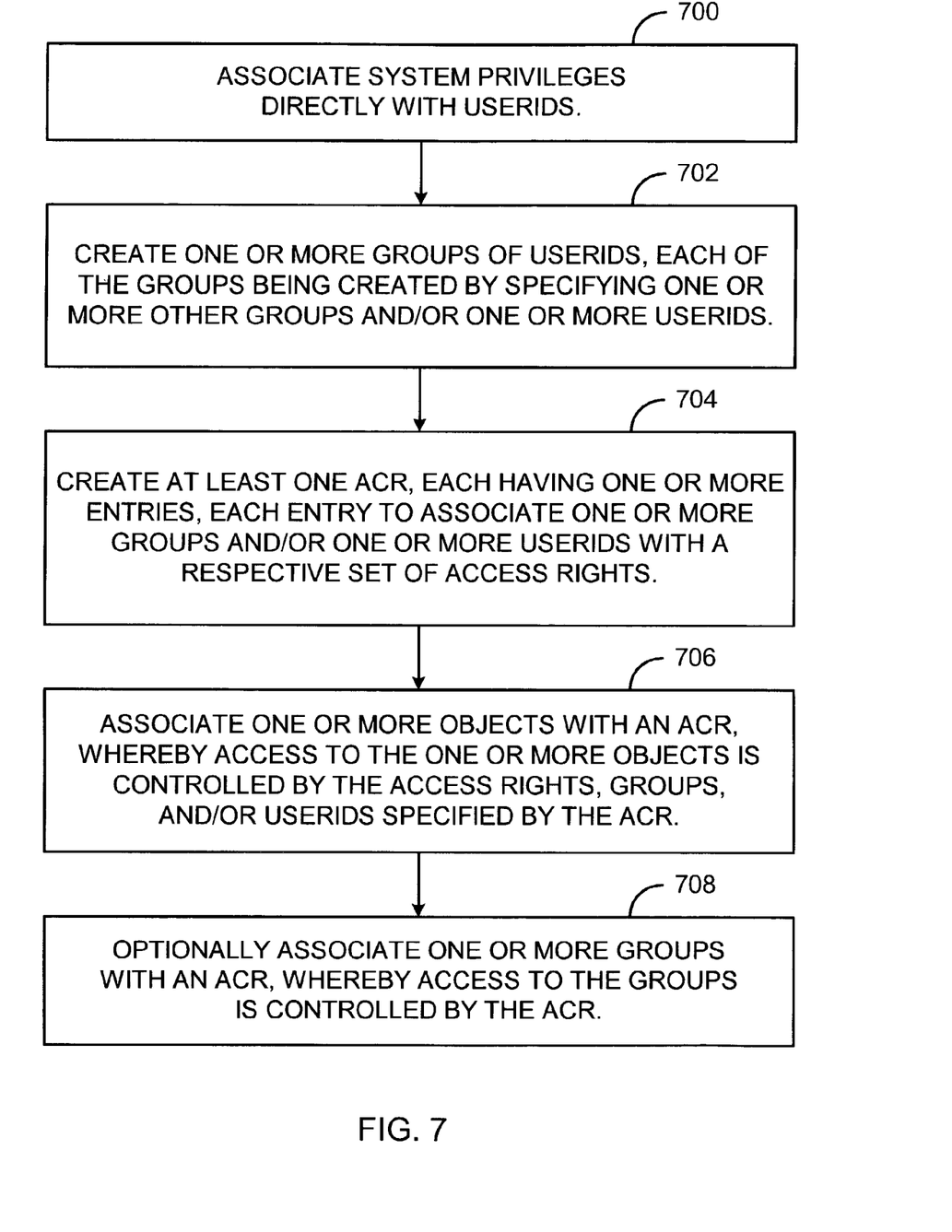
FIG. 7 is a flow diagram of a method according to one embodiment of the invention.

FIG. 7 is a flow diagram illustrating an exemplary method of managing objects according to the current invention. It will be appreciated by those skilled in the art that the ordering of the method steps in FIG. 7 is largely arbitrary. First, privileges are associated directly with userids (700). One or more groups of userids are created, with each group identifying one or more other groups and/or one or more userids (702). At least one ACR is created having one or more entries. Each entry associates one or more groups and/or userids with a set of access rights (704). One or more objects may then be associated with an ACR (706). This may be accomplished by identifying an ACR within an object. This association allows the access rights specified by the ACR to be used to control access to the object. If desired, one or more of the groups may each be associated with an ACR in the manner discussed in step 706 to control access to those groups (708).

It will be understood that the above-described systems and methods are exemplary. Thus, the embodiments of the invention herein described are merely illustrative of the principles of the invention, and are not intended to limit the scope of the claims, which themselves recite those features regarded as essential to the invention.

What is claimed is:

1. For use in a data processing system that stores objects, wherein users of the data processing system are allowed access to the objects based on assigned access rights, a method for controlling access to the objects, comprising:
 a.) creating at least one group stored on the data processing system, each identifying one or more of the users of the data processing system without regard to any access rights granted to the one or more users;
 b.) creating at least one access control record (ACR), each identifying at least one group and that further identifies a set of one or more of the access rights for the group;
 c.) for each of the objects, storing an identifier of exactly one ACR associated with the object; and
 d.) for each object, allowing a user that is identified by a group that is identified by the associated ACR to access the object according to the set of access rights identified for the group.

2. The method of claim 1, wherein step a.) includes creating multiple groups.

3. The method of claim 2, and further including creating at least one group that identifies one or more other ones of the multiple groups.

4. The method of claim 2, wherein the multiple groups define a hierarchical structure.

5. The method of claim 2, wherein each of the users are assigned a respective userid, and wherein step a.) includes identifying a respective userid for each of the one or more users.

6. The method of claim 5, and further including identifying all of the multiple groups that identify a userid.

7. The method of claim 6, and further including:
 deleting the userid; and
 causing the userid to be automatically deleted from all of the multiple groups that identify the userid.

8. The method of claim 2, wherein at least one of the one or more objects is one of the groups.

9. The method of claim 2, wherein step b.) includes creating an ACR that identifies more than one of the multiple groups.

10. The method of claim 9, wherein the ACR identifies at least one of the users by identifying a userid.

11. The method of claim 1, wherein the users are allowed to perform restricted operations within the data processing system based on assigned privileges, and further including assigning privileges directly to the one or more users.

12. The method of claim 11, wherein step a.) includes identifying respective userids for the one or more users, and further including associating assigned privileges with a respective userid for each of the one or more users.

13. The method of claim 1, and including:
accepting a request from one of the one or more users, the request requiring access to one of the one or more objects; and
using the ACR to control access to the one of the one or more objects based on the one or more access rights identified by the ACR.

14. The method of claim 13, wherein the data processing system includes a software cache, and further including storing at least one of the groups and the ACR in the software cache.

15. The method of claim 14, wherein storing at least one of the groups and the ACR in the software cache is performed only if the request is a predetermined type of request.

16. The method of claim 15, and further including determining whether the one or the one or more users is assigned a privilege that allows making the predetermined type of request.

17. The method of claim 1, and further including assigning to a user an ability to create a predetermined number of groups.

18. The method of claim 1, and further including:
selecting a system default number of groups; and
allowing a user to create up to the system default number of groups;
over-riding the system default number by assigning a different second
number of groups to the user; and
allowing the user to create up to the second number of groups.

19. The method of claim 1, wherein the ACR identifies multiple sets of access rights, and wherein the ACR associates each of the multiple sets of access rights with respective ones of the users.

20. The method of claim 1, wherein step c.) includes recording an identifier for the ACR within each of the one or more objects.

21. For use within a data processing system having at least one storage device to store objects, a system for granting users of the data processor access to the objects according to assigned access rights, comprising:
first circuits included within the at least one storage device to store one or more groups, each group identifying one or more of the users without identifying any access rights;
second circuits included within the at least one storage device to store one or more access control records (ACRs), each ACR associating at least one of the groups to a set of one or more of the access rights; and
third circuits included within the at least one storage device to store, for each of the objects, an identifier that associates an object with exactly one of the ACRs, whereby the users identified by the at least one of the groups that is associated by the ACR are granted the associated set of access rights to access the object.

22. The system of claim 21, wherein the first circuits include circuits to store, for each of the one or more of the users, a respective userid.

23. The system of claim 21, wherein the second circuits include circuits to store, for each of the ACRs, multiple sets of the access rights, and to associate any of the sets to one or more of the groups.

24. The system of claim 23, wherein the second circuits include circuits to associate any of the sets directly to one or more users.

25. The system of claim 21, wherein the data processing system includes a mass storage facility, and wherein at least ones of the first, second, and third circuits reside within the mass storage facility.

26. The system of claim 21, wherein the data processing system includes a software cache, and wherein at least ones of the first, second, and third circuits reside within the software cache.

27. The system of claim 21, wherein the first circuits include circuits to store, for each of the one or more groups, identifiers identifying one or more other groups.

28. The system of claim 21, and further including fourth circuits included within the at least one storage device to associate ones of the users with system privileges.

29. The system of claim 28, wherein the fourth circuits include circuits to associate respective userids for the ones of the users with system privileges.

30. A system for controlling access to objects managed by a data processing system, comprising:
means for creating groups of users of the data processing system without regard to access rights used to access the objects;
means for creating ACRs, each ACR identifying at least one of the groups, and further identifying one or more of the access rights; and
means for associating each object with exactly one of the ACRs, whereby users included in the at least one of the groups identified by the associated ACR are granted the identified one or more access rights to access the object.

31. The system of claim 30, wherein the means for creating groups includes means for allowing a group of users to be defined by identifying at least one other of the groups of users.

32. The system of claim 30, wherein the means for creating groups includes means for identifying a userid for each of the users included within a group.

33. The system of claim 32, and further including means for storing the identified userids; and
means for storing, for each of the identified userids, a list of the groups that identify the userid.

34. The system of claim 30, wherein the means for creating ACRs includes means for identifying one or more sets of access rights, each of the sets including one or more of the access rights, ones of the sets being associated with one or more groups, whereby users included within the one or more groups are granted the associated set of access rights to access an object that is associated with the ACR.

35. The system of claim 34, wherein the means for creating recording includes means for associating any of the one or more sets of the access rights with one or more individual users.

36. The system of claim 30, wherein the means for associating any of the objects includes means for storing a record identifier for the one of the records within the object.

37. The system of claim 30, and further including means for storing system privileges, and for granting ones of the users one or more of the system privileges.

38. The system of claim 37, and further including means for storing the userids for the ones of the users, and further for storing, for each of the userids, any of the system privileges granted to the user of the userid.

39. The system of claim 30, and further including means for associating one or more of the groups each with a respective one of the ACRs, whereby access to the one or more of the groups is controlled using the access rights and groups of users identified by the respective one of the ACRs.

40. The system of claim 30, and further including software cache means for storing ones of the groups and ones of the ACRs.

* * * * *

UNITED STATES PATENT AND TRADEMARK OFFICE
CERTIFICATE OF CORRECTION

| | | |
|---|---|---|
| PATENT NO. | : 7,219,234 B1 | Page 1 of 1 |
| APPLICATION NO. | : 10/202111 | |
| DATED | : May 15, 2007 | |
| INVENTOR(S) | : Richard E. Ashland and Roland G. Clouse | |

It is certified that error appears in the above-identified patent and that said Letters Patent is hereby corrected as shown below:

In claim 36, Column 12, Line 67: "a record" should be --an ACR-- and "records" should be --ACRs--

Signed and Sealed this

First Day of July, 2008

JON W. DUDAS
*Director of the United States Patent and Trademark Office*